(12) United States Patent
Yeung et al.

(10) Patent No.: US 10,070,302 B2
(45) Date of Patent: Sep. 4, 2018

(54) INTERNET OF THINGS (IOT) DELAY TOLERANT WIRELESS NETWORK SERVICE

(71) Applicant: Verizon Patent and Licensing Inc., Arlington, VA (US)

(72) Inventors: Wing-Cheong V. Yeung, San Ramon, CA (US); Suzann Hua, Walnut Creek, CA (US); Priscilla Lau, Fremont, CA (US); Rezwanul Azim, Walnut Creek, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 59 days.

(21) Appl. No.: 15/251,070

(22) Filed: Aug. 30, 2016

(65) Prior Publication Data
US 2018/0063860 A1 Mar. 1, 2018

(51) Int. Cl.
*H04W 72/12* (2009.01)
*H04W 8/20* (2009.01)
*H04W 84/14* (2009.01)
*H04L 29/08* (2006.01)
*H04W 60/00* (2009.01)

(52) U.S. Cl.
CPC .............. *H04W 8/20* (2013.01); *H04L 67/12* (2013.01); *H04W 60/00* (2013.01); *H04W 84/14* (2013.01)

(58) Field of Classification Search
CPC ... H04W 72/1242; H04W 8/20; H04W 84/14; H04L 67/12
See application file for complete search history.

(56) References Cited

U.S. PATENT DOCUMENTS

| | | | |
|---|---|---|---|
| 2002/0075844 A1* | 6/2002 | Hagen | H04L 63/0442 370/351 |
| 2011/0171979 A1* | 7/2011 | Rune | H04W 24/02 455/458 |
| 2012/0057547 A1* | 3/2012 | Lohr | H04L 5/0007 370/329 |
| 2012/0069737 A1* | 3/2012 | Vikberg | H04W 28/12 370/232 |
| 2013/0051326 A1* | 2/2013 | Jeyatharan | H04L 47/245 370/328 |
| 2013/0058315 A1* | 3/2013 | Feuersanger | H04W 52/281 370/336 |
| 2014/0348080 A1* | 11/2014 | Griot | H04W 28/0263 370/329 |
| 2015/0085658 A1* | 3/2015 | Hong | H04W 28/0289 370/235 |

(Continued)

*Primary Examiner* — Jay P Patel

(57) ABSTRACT

A network device receives signaling associated with a wireless device of a subscriber to a delay-tolerant wireless network service, and downloads a service profile of the subscriber from a Home Subscriber Server (HSS) associated with a wireless network. The network device retrieves, from the downloaded service profile, a signaling priority value associated with the subscriber or with the wireless device, and identifies whether the signaling priority value indicates a low priority value. The network device prioritizes the processing of signaling associated with a plurality of wireless devices based on whether the signaling priority value indicates the low priority value, wherein the plurality of wireless devices includes the wireless device.

20 Claims, 10 Drawing Sheets

(56) References Cited

U.S. PATENT DOCUMENTS

2016/0100353 A1* 4/2016 Gleixner ............... H04W 48/16
                                                  370/329
2016/0156676 A1* 6/2016 Verin .................. H04L 65/1016
                                                  709/228
2017/0086012 A1* 3/2017 Jimenez ................ H04W 4/005
2017/0257876 A1* 9/2017 Loehr .................. H04W 72/10
2017/0295536 A1* 10/2017 Kim ...................... H04W 48/06
2017/0332431 A1* 11/2017 Kim .................... H04W 76/028
2017/0346609 A1* 11/2017 Li ........................ H04W 72/10
2017/0347368 A1* 11/2017 Juneja .................... H04W 8/18

* cited by examiner

INTERNET OF THINGS (IOT) DELAY TOLERANT WIRELESS NETWORK SERVICE

BACKGROUND

The "Internet of Things" (IoT) is a network of physical devices (i.e., "things") where the devices are specially designed for a specific function, unlike general computing devices like a desktop or laptop computer. IoT devices are embedded with electronics and network connectivity that enables these objects or devices to collect, store and exchange data. The network connectivity may include, for example, Bluetooth connectivity, Wi-Fi connectivity, and/or cellular network connectivity. An IoT device may additionally have computational capability, with various installed software (e.g., apps), and may also include one or more of various types of sensors. An IoT device may be, via the network connectivity, controlled remotely across existing network infrastructure. An IoT device may use the network connectivity to communicate with other IoT devices, or with certain nodes (e.g., a particular server or computer) across the Internet.

DETAILED DESCRIPTION OF THE PREFERRED EMBODIMENTS

Figure 1A:
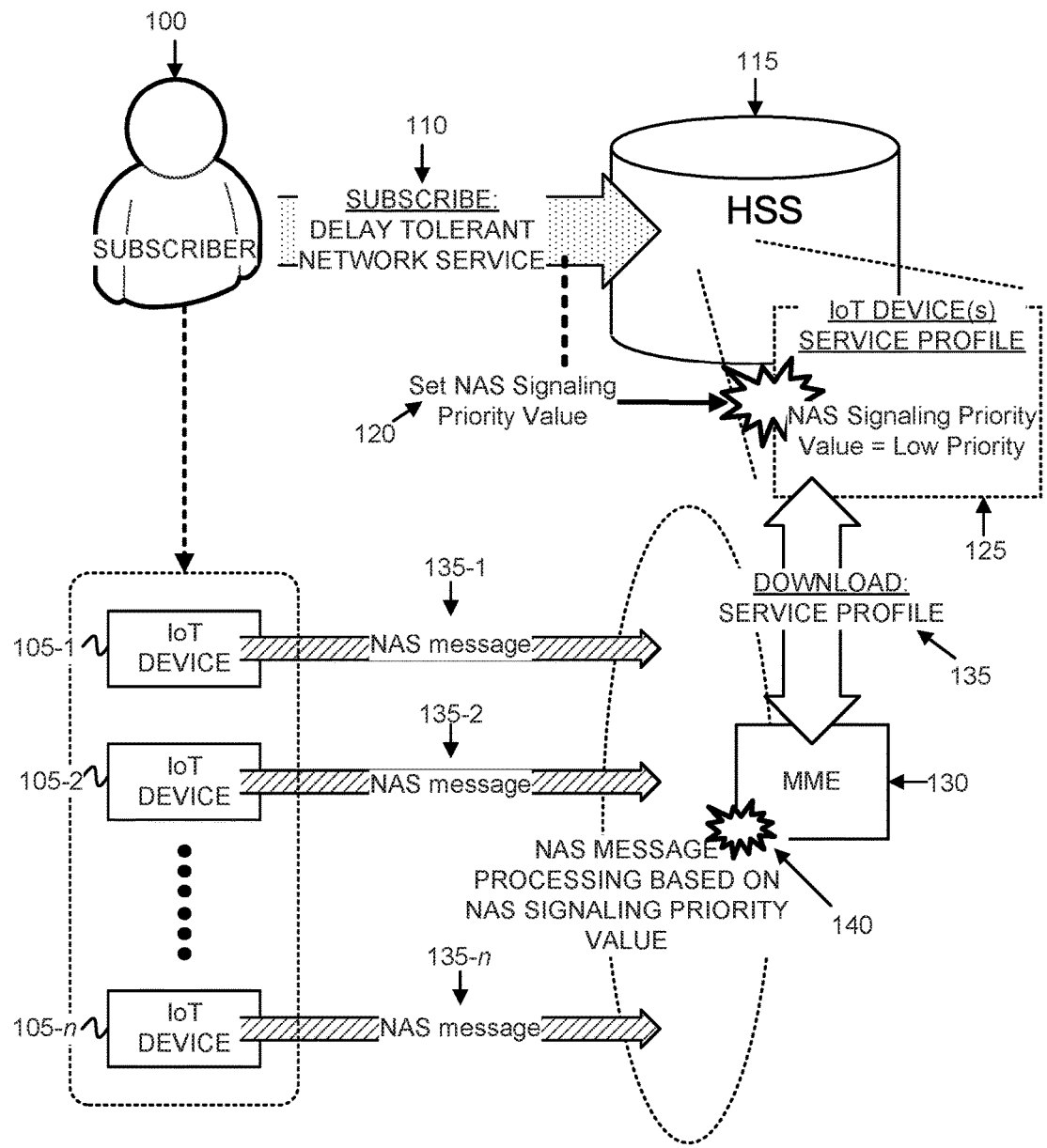
FIGS. 1A and 1B illustrate an exemplary overview of a subscriber's subscription to a delay-tolerant network service for wireless IoT devices, and the use of a Non-Access Stratum signaling priority value for determining the priority in which to process NAS messages received from multiple different devices, including the wireless IoT devices.

The following detailed description refers to the accompanying drawings. The same reference numbers in different drawings may identify the same or similar elements. The following detailed description does not limit the invention, which is defined by the claims.

An IoT device may include any number of devices, such as sensors. IoT sensors may include, for example, temperature sensors, humidity sensors, pedestrian sensors, smoke detectors, vehicle sensors, proximity sensors, motion detectors, and open/close door sensors. These IoT sensors may be used by meteorologists to predict the weather; in "smart cities" to time traffic lights and detect traffic accidents; by emergency services to detect forest fires; by homeowners to detect intruders or house fires. As these IoT devices proliferate, the number of IoT devices may greatly outnumber non-IoT devices (such as our mobile phones). The expected number of IoT devices threatens to overwhelm any wireless network. Many of these IoT devices, however, may be "delay tolerant" in that the services they provide (e.g., a providing the temperature) and the corresponding devices may not necessarily need the same level of service from the mobile network as other devices.

To protect a wireless network from excessive signaling from a large number of devices over a same period of time, Non-Access Stratum (NAS) signaling messages associated with the devices may be prioritized based on different priority levels assigned by the wireless network to the different devices. In some implementations, the different NAS signaling priority levels may be configured at each wireless device. The NAS signaling messages associated with a particular wireless device includes network signaling related to mobility management functions, call control management functions, session management functions, and/or identity management functions performed by a wireless network. For a wireless device, or application, that can accept a lower level of priority (i.e., can tolerate network service delay) in its wireless network service, a NAS signaling priority can, in some implementations, be set to "low priority" at the wireless device or the application. An example of a wireless device that can accept a lower priority of wireless network service is an IoT device that may transmit and/or receive messages or data, not requiring any type of urgency or timeliness in transmission or reception, via the wireless network.

Exemplary embodiments described herein enable a subscriber to subscribe to a delay-tolerant network service for one or more of the subscriber's wireless devices (e.g., IoT devices), and the one or more wireless devices may be configured with a priority indicator, such as a "low priority" access indicator. Additionally, or alternatively, a signaling priority parameter may be set to "low priority" within the subscriber's service profile within a subscriber profile database, such as, for example, in a database associated with a Home Subscriber Server (HSS) of the wireless network. When a control node (e.g., a mobility management entity) of the wireless network receives signaling from the subscriber's wireless device(s), the control node retrieves the "low priority" access indicator from the signaling message, and/or downloads the service profile from the HSS and retrieves the signaling priority parameter from the service profile. The control node may then prioritize processing of the NAS signaling from the subscriber's wireless device(s), relative to NAS signaling received from other wireless devices, based on the "low priority" access indicator and/or the signaling priority parameter. For example, in one embodiment, the control node may process the NAS signaling from the subscriber's wireless device(s) after processing NAS signaling from other wireless devices based on the indication of the "low priority" access indicator, or contained in the signaling priority parameter. In some implementations, in the event that the control node becomes overloaded, NAS signaling (e.g., access or service requests) from "low priority" devices or subscribers may be, instead of delayed relative to NAS signaling associated with higher priority devices or subscribers, dropped or rejected.

Figure 1B:
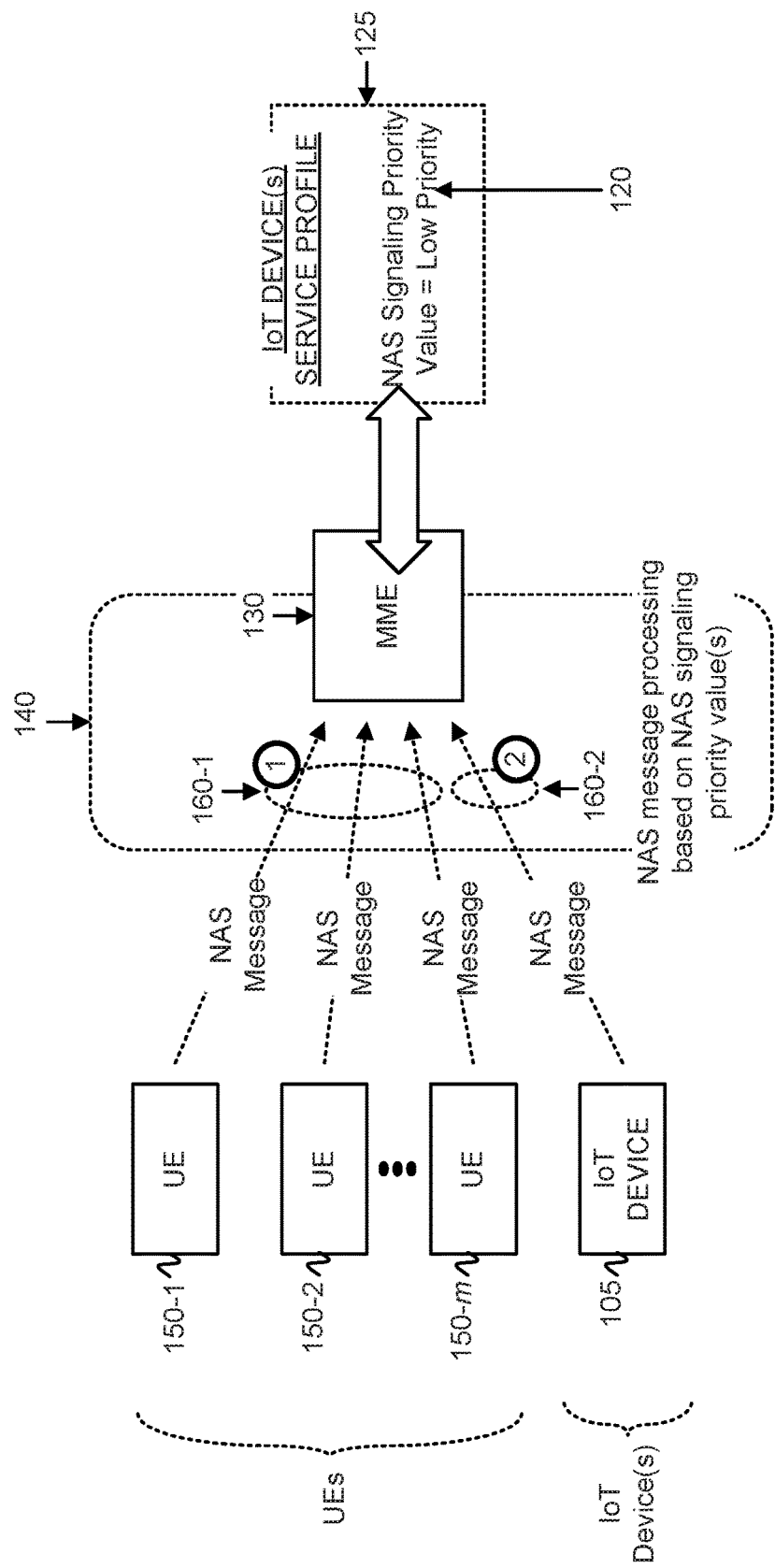

FIGS. 1A and 1B illustrate an exemplary overview of a subscriber's subscription to a delay-tolerant network service for delay-tolerant wireless devices. These figures also illustrate the use of a NAS signaling priority value stored in a Home Subscriber Server (HSS) of a wireless network, for determining the priority in which to process NAS messages received from multiple different devices, including the delay-tolerant wireless devices. FIG. 1A depicts the setting of a NAS signaling priority value to a low priority value, and use of the NAS signaling priority value in prioritizing NAS signaling messaging associated with a particular wireless IoT device among a group of wireless devices. As shown in FIG. 1A, a subscriber 100, who may be an owner, operator, and/or administrator of IoT devices 105-1 through 105-n, may subscribe 110 to a delay-tolerant network service offered by a wireless network provider (e.g., a Public Land Mobile Network (PLMN) provider). In one embodiment, a "subscriber" is any way of associating a device with an account with a delay-tolerant network service. Based on the subscription of subscriber 100 to the delay-tolerant network service, a HSS 115 may set a NAS signaling priority value 120 to a "low priority" value within an IoT device(s) service profile 125 stored within HSS 115 (e.g., in a database). In one implementation, the service profile 125 may be a profile applicable to all devices registered to subscriber 100. In another implementation, the service profile 125 may be a profile applicable to a designated subset of multiple IoT devices registered to subscriber 100. In yet another implementation, the service profile 125 may be a profile applicable only to a single designated IoT device registered to subscriber 100.

Upon subscribing to the delay-tolerant network service, subscriber 100 may specify which device or devices of the subscriber to which the delay-tolerant network service is to be applied. In one embodiment, the "low priority" value of the NAS signaling priority value indicates that NAS signaling associated with the designated IoT device(s) is to be prioritized lower in priority relative to NAS signaling associated with other devices not having a "low priority" NAS signaling priority value. In this embodiment, the lower prioritization of NAS signaling associated with a particular IoT device means that the wireless network processes the NAS signaling after other NAS signaling associated with other devices. The NAS signaling associated with IoT devices 105-1 through 105-n, and associated with other wireless devices (not shown in FIG. 1A), includes network signaling related to one or more of the following network functions: mobility management, call control management, session management, and/or identity management.

As further shown in FIG. 1A, a mobility management entity (MME) 130 of the wireless network may download 135 the service profile 125 from HSS 115, and extract the NAS signaling priority value 120 from the service profile 125. MME 130 includes a key control node for the wireless network (e.g., a PLMN), and performs mobility management functions, call control management functions, session management functions, and/or identity management functions associated with providing network service to IoT devices 105. In this example, the NAS signaling associated with IoT devices 105, and other wireless devices (not shown in FIG. 1A), terminates at MME 130. MME 130 may receive NAS messages 135-1 through 135-n (e.g., initial attach request messages) from IoT devices 105-1 through 105-n (and from other User Equipments (UEs) not shown in FIG. 1A), and may process 140 those NAS messages based on the NAS signaling priority value retrieved from the downloaded service profile 125, as described in further detail with respect to FIG. 1B.

FIG. 1B depicts further details of the processing of NAS signaling at MME 130 based on the NAS signaling priority value 120 retrieved from an IoT device(s) service profile 125. As shown in FIG. 1B, NAS messages 160-1 associated with multiple UEs 150-1 through 150-m (generically referred to as "UE 150" or "UEs 150") may be received at MME 130 within a same time period in which a NAS message 160-2 associated with IoT device 105 may also be received at MME 130. The same time period may include a specific, configurable time interval (e.g., a time interval ranging, for example, from about 10 microseconds to about 5 seconds) over which multiple different NAS messages are received from multiple different devices and considered to essentially be received at, or about, the same time at MME 130. In one implementation, the configurable time interval may be an interval of 50-100 milliseconds. The configurable time interval may, however, include any interval of time over which it is to be considered that different NAS messages are received at a same time. In other words, NAS messages 160 are received within a same time period such that they compete for resources from MME 130 acting in response. The NAS message 160-2 associated with IoT device 105 may include, for example, an initial attach message received at MME 130 from IoT device 105. The NAS messages 160-2 associated with UEs 150-1 through 150-m may each also include, for example, an initial attach message, or other types of NAS messages (e.g., a service request message).

UEs 150 may each include an electronic device that further includes a communication interface for communicating via a wireless network(s). UEs 150 may each include, for example, a cellular radiotelephone; a smart phone; a personal digital assistant (PDA); a wearable computer; a desktop, laptop, palmtop or tablet computer; or a media player. UEs 150 may include any type of electronic device that includes a communication interface for communicating via the wireless network(s). A "user" or "subscriber" (not shown in FIG. 1B) may be associated with each UE 150, where the user or subscriber may be an owner, operator, and/or a permanent or temporary user of UE 150.

For each UE 150, and IoT device 105, MME 130 accesses a service profile (e.g., service profile 125 of IoT device 105 shown by way of example in FIG. 1B) and retrieves any NAS signaling priority value 120 stored in the service profile 125. In the case of IoT device 105, MME 130 retrieves NAS signaling priority value 120, set to a "low priority" value, from IoT device(s) service profile 125. MME 130 evaluates the priority level specified by the NAS signaling priority value 120 to identify whether the value indicates that the IoT device 105 is associated with a subscription to a delay-tolerant network service. If there is no NAS signaling priority value 120 stored in service profile 125, or if the value indicates that the IoT device 105 is not associated with the subscription to the delay-tolerant network service, then MME 130 may process the NAS messages 160 from UEs 150-1 through 150-2 and IoT device using existing processing mechanisms. Such existing mechanisms may include, for example, processing the NAS messages 160 on a first-come/first served basis based on a time stamp (to a millisecond or microsecond resolution) associated with when each particular NAS message is received at MME 130. If the NAS signaling priority value 120 stored in service profile 120 indicates that the IoT device 105 is associated with a subscription to a delay-tolerant network service, then MME 130 processes the NAS message 160-2 associated with IoT device 105, relative to the NAS messages 160-1 associated with UEs 150, in accordance with the lower priority indicated by the NAS signaling priority value 120 retrieved from service profile 120. For example, MME 130 may process all of the NAS messages 160-1 associated with UEs 150 before processing the NAS message 160-2 associated with IoT device 105, thus, resulting in a delay in executing any mobility management functions, call control management functions, session management functions, and/or identity management functions performed by MME 130 with respect to IoT device 105. The relative temporal processing of the NAS messages 160-1 from UEs 150, and the NAS message 160-2 from IoT device 105, is shown via the "1" (i.e., processed first) within a circle associated with the NAS messages 160-1 of UEs 150, and the "2" (i.e., processed second) within a circle associated with the NAS message 160-2 of IoT device 105. Therefore, in accordance with some embodiments described herein, lower priority NAS signaling can be delayed in favor of higher priority NAS signaling. However, a practical upper limit exists on how long lower priority NAS signaling may be delayed without the control node providing a response to the IoT device 105 (or UE 150) before the IoT device 105 (or UE 150) retransmits the NAS signaling. Thus, in some implementations, an upper bound may be set on the maximum amount of delay that can be applied to lower priority NAS signaling to avoid the IoT device 105 or UE 150 retransmitting the NAS signaling.

The exemplary overview depicted in FIGS. 1A and 1B has been described with respect to a wireless device (e.g., UE or IoT device) having either no NAS signaling priority value associated with it, equating to normal NAS message processing, or having a "low priority" NAS signaling priority value associated with it, equating to a slower NAS message processing relative to other wireless devices. In other implementations, a wireless device may have a NAS signaling priority value of "high" associated with it, or a NAS signaling priority value of "low" associated with it to distinguish between the processing priorities to be applied to the wireless device relative to other wireless devices. In yet other implementations, a wireless device may have one of at least three different NAS signaling priority values associated with it—such as a NAS signaling priority value of "high," a NAS signaling priority value of "medium," or a NAS signaling priority value of "low." In yet other implementations, a wireless device may have a numeric NAS signaling priority value associated with it—such as a NAS signaling priority value of "10," a NAS signaling priority value of "5," or a NAS signaling priority value of "1." With different NAS signaling priority values, NAS messaging associated with multiple different devices may be processed relative to one another at different prioritized time periods (e.g., "high" or "10" priority first, followed by "medium" or "5" priority second, followed by "low" or "1" priority last). In addition, although FIG. 1B shows multiple UEs 150 and one IoT device 105, in some environments IoT devices 105 may greatly outnumber UEs 150, which may otherwise overwhelm MME 130 without prioritization of NAS messages 160.

Figure 2:
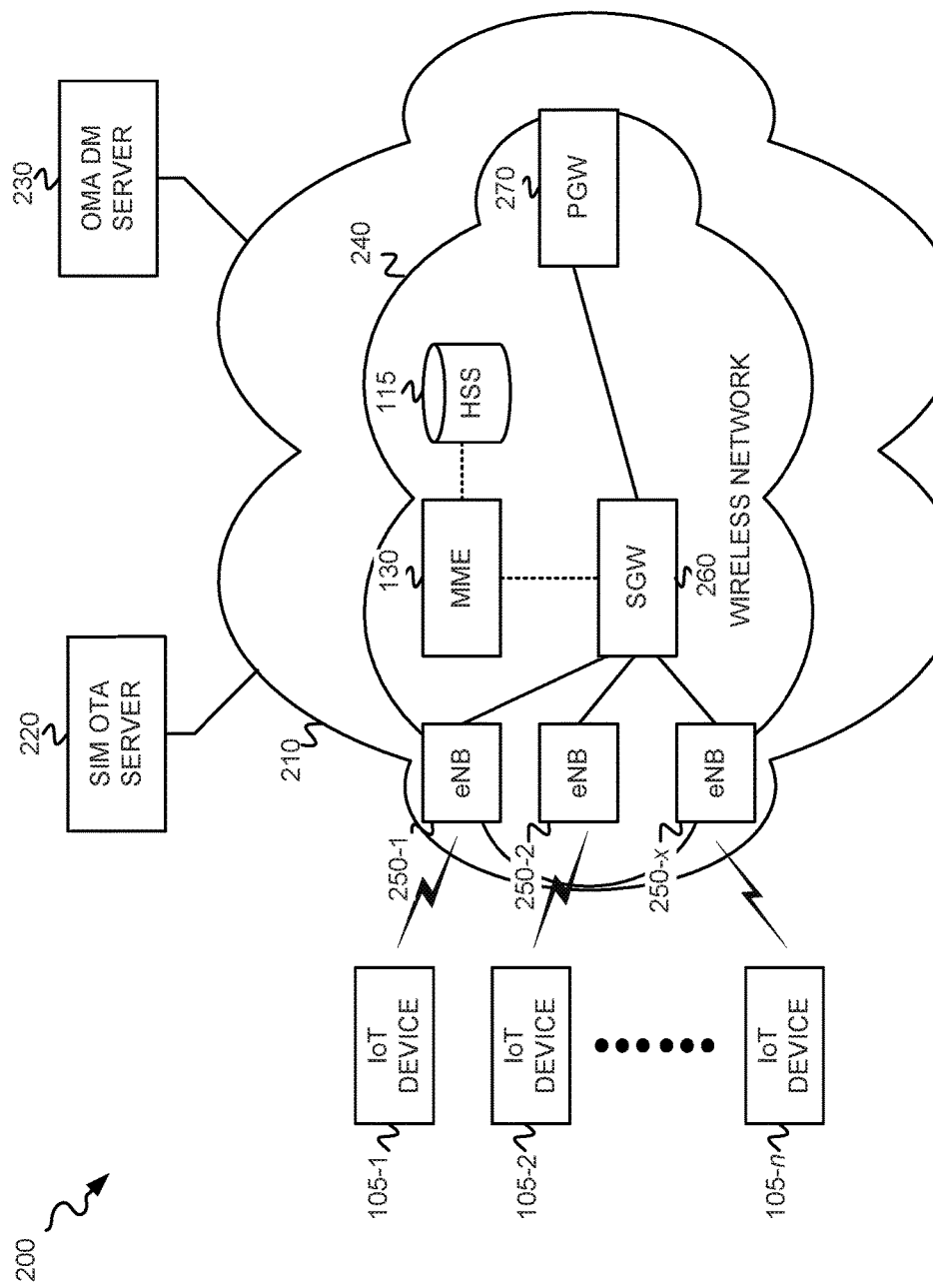
FIG. 2 illustrates an exemplary network environment 200 in which the delay-tolerant network service of FIG. 1 may be implemented.

FIG. 2 illustrates an exemplary network environment 200 in which a delay-tolerant network service may be implemented. Network environment 200 may include IoT devices 105-1 through 105-n, a network 210, a subscriber identity module (SIM) Over-the-Air (OTA) server 220, and an Open Mobile Alliance (OMA) Device Management (DM) server 230.

IoT devices 105-1 through 105-n (generically referred to herein as "IoT device 105" or "IoT devices 105") may each include a physical object or device (i.e., a "thing") that may be designed for a specific function and which may be embedded with electronics, memory storage, and network connectivity that enables these objects or devices to collect, store and exchange data with other IoT devices or with certain network nodes. Each device 105's network connectivity may include, for example, Bluetooth, Wi-Fi, and/or cellular network.

IoT devices 105 may include a smart card for storing information, data, or applications (apps) relevant to the operation of the corresponding IoT device 105, such as, for example, for performing authentication and application enabling with a wireless network (e.g., a PLMN). Each smart card may include, for example, a Universal Integrated Circuit Card (UICC), a removable user identity card (R-UIM), a SIM, a universal subscriber identity module (USIM), or an Internet Protocol (IP) multimedia services identity module (ISIM). SIM cards securely store an identifier or key used to identify a subscriber on wireless devices. SIM cards enable users to change devices by removing the SIM card from one device and inserting it into another device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS networks. USIMs include smart cards having features that are usable with UMTS networks. ISIMs include smart cards having features that are usable with UMTS 3G or Internet Protocol Multimedia Subsystem (IMS) Long-Term Evolution (LTE) networks. In one embodiment, the smart card may be implemented as a software module in IoT device 105.

SIM OTA server 220 may include one or more network devices that communicate with a smart card of each IoT device 105, or UEs 150, via network 210 to remotely change or update data, settings, apps, functions, and/or services at IoT devices 105 or UEs 150.

OMA DM server 230 may include one or more network devices that implement the OMA DM device management protocol for managing devices, such as for example, IoT devices 105, mobile phones (e.g., UEs 150), PDAs and palm top computers. OMA DM server 230 may configure the devices, including IoT devices 105, by supplying application parameters used in the operation of the devices, may enable and disable features of the devices, and may change settings of the devices. OMA DM server 230 may also provide firmware and/or software upgrades to the devices, and may provide fault management of the devices (e.g., report errors from the devices, etc.).

Network 210 may include may multiple networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network). In the implementation depicted in FIG. 2, network(s) 210 includes a wireless network 240 (e.g., a PLMN and/or a satellite mobile network) connected to other networks, such as, for example, the Internet.

As shown, wireless network 240 may include eNodeBs 250-1 through 250-x, a serving gateway (SGW) 260, MME 130, HSS 115, and a packet data network gateway (PGW) 270.

eNodeBs 250-1 through 250-x (generically referred to as "eNB 250" or "eNBs 250") each include hardware that communicates directly with wireless devices (e.g., IoT devices 105 and UEs 150) to enable network service with wireless network 240 (e.g., a PLMN). Each of eNBs 250 includes a wireless transceiver for communicating with the wireless devices, and a wired or wireless connection to other nodes of wireless network 240.

SGW 260 includes one or more network devices that route and forward data packets received from IoT devices 105 and/or UEs 150 and destined for destination nodes in network 240 or network 210, and received from PGW 270 and destined for one or more destination IoT devices 105 or UEs 150.

MME 130 includes one or more network devices that perform, within wireless network 240, mobility management functions, call control management functions, session management functions, and/or identity management functions associated with providing wireless network service to IoT devices 105 and/or UEs 150.

HSS 115 includes one or more network devices that store a central database that contains subscriber-related and subscription-related information. HSS 115 performs, based on the information stored in the database, a user authentication function, a session establishment function, and an access authorization function.

PGW 270 includes one or more network devices that provide connectivity from the IoT devices 105 and UEs 150 to external packet data networks (e.g., other networks in network 210).

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2. For example, the UEs 150-1 through 150-m, depicted in FIG. 1B, are not shown in FIG. 2 for purposes of simplicity. However, in the network environment of FIG. 2, one or more UEs 150 may also each maintain a wireless connection with eNBs 250-1 through 250-x, in addition to the IoT devices 105 shown. Additionally, subscriber 100 (shown in FIG. 1A), in addition to being associated with IoT devices 105, may own, operate or administer a user device (not shown in FIG. 1A or FIG. 2), such as a desktop, laptop, or tablet computer, or a "smart" phone, that subscriber 100 may use to access a subscriber account and subscribe to the delay-tolerant network service described herein. The subscription information received from subscriber 100 via the user device may be received at HSS 115 in block 400 of the exemplary process of FIG. 4, described below.

Figure 3:
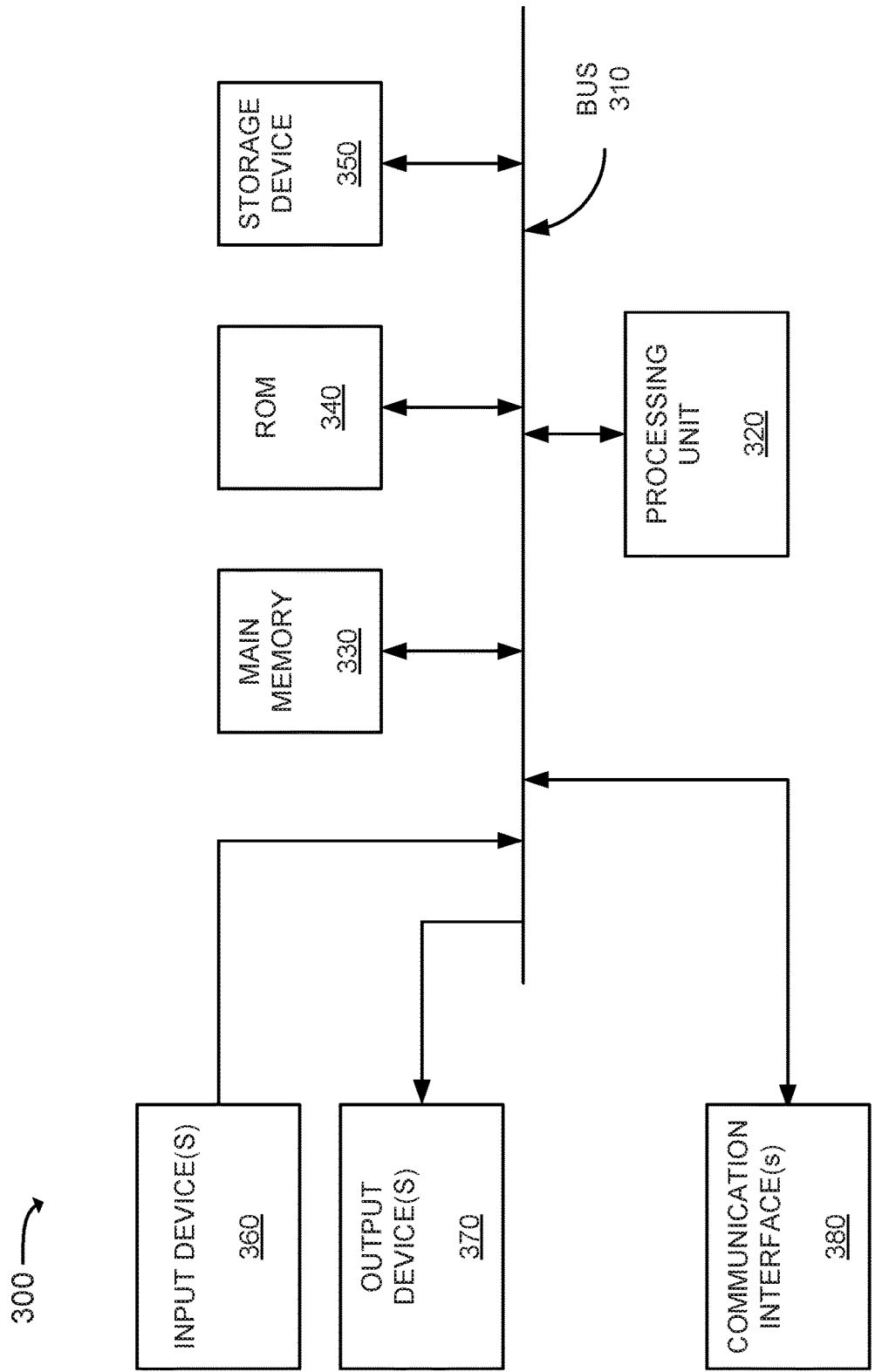
FIG. 3 is a diagram that depicts exemplary components of a device that may correspond to the IoT devices, mobility management entity, home subscriber server, and over-the-air servers of FIG. 1A, 1B, or 2.

FIG. 3 is a diagram that depicts exemplary components of a device 300. IoT device 105, MME 130, HSS 115, UEs 150, SIM OTA server 220, and OMA DM server 230 may each include a device similar to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may be a "tangible and/or non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network(s) 210 and/or 240. In the case of device 300 being an IoT device 105, communication interface(s) 380 may include only a wireless transceiver(s), such as, for example, a transceiver for communicating with an eNB 250 of wireless network 240.

The configuration of components of device 300 shown in FIG. 3 is for illustrative purposes. Other configurations may be implemented. Therefore, device 300 may include additional, fewer and/or different components, arranged in a different configuration, than depicted in FIG. 3. For example, an IoT device 105 may include similar components to those shown in FIG. 3, but may omit input device(s) 360, output device(s) 370, and storage device 350.

Figure 4:
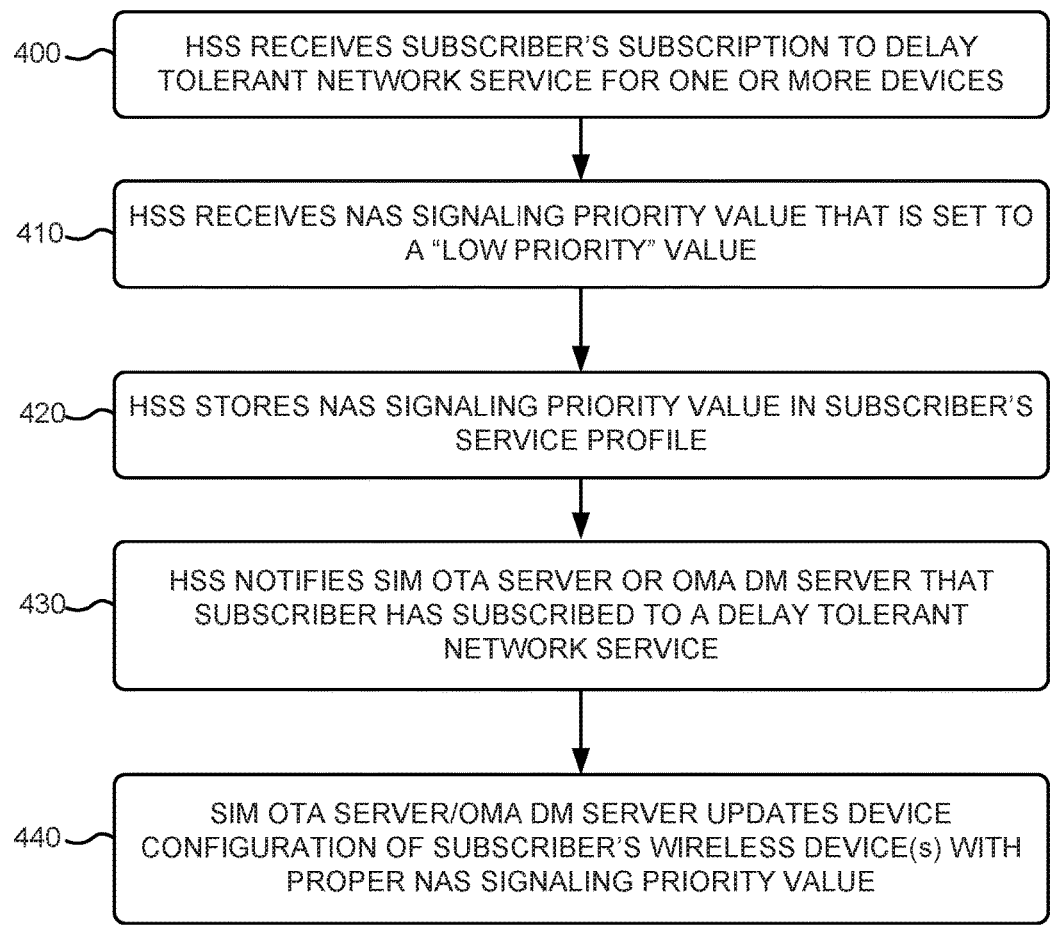
FIG. 4 is a flow diagram that illustrates an exemplary process for subscribing to a delay-tolerant network service for one or more devices.

FIG. 4 is a flow diagram that illustrates an exemplary process for receiving a subscription to a delay-tolerant network service, for one or more devices, in wireless network 240. In one implementation, the exemplary process of FIG. 4 may be implemented by HSS 115.

The exemplary process includes HSS 115 receiving a subscriber's subscription to a delay-tolerant network service for one or more of the subscriber's wireless devices (block 400). HSS 115 may receive subscription information directly from a user device used by subscriber 100, or indirectly from another node of network 240. Since IoT devices 105 may not require urgent, immediate, or even time sensitive delivery of data and/or control acknowledgment messages, subscriber 100 may decide to subscribe to the delay-tolerant network service offered by the network service provider of network 240 (e.g., the PLMN network service provider). In one embodiment, the network service provider of network 240 may offer delay-tolerant network service with a lower priority than normal or high priority network services. In one implementation, the network service provider may offer a "regular" wireless network service, where signaling associated with devices not assigned to a "low priority" service level is dealt with on a normal, first-come-first-served basis, and a "low priority" service level, where signaling associated with devices assigned the "low priority" service level is processed subsequent to signaling received from devices not assigned to the "low priority" service level. In another implementation, the network service provider may offer multiple different network service priorities, such as "high priority," "medium priority," and "low priority." In such an implementation, signaling associated with devices assigned a "high priority" service level is processed before signaling associated with devices assigned a "medium priority" or a "low priority." Further, in such an implementation, signaling associated with devices assigned a "medium priority" service level is processed after "high priority" service level signaling, but before "low priority" service level signaling. Additionally, in such an implementation, signaling associated with devices assigned to a "low priority" service level is processed after signaling associated with devices assigned a "high priority" and a "medium priority" service level. Similarly, where numeric priority levels are assigned, devices assigned higher valued priorities may take priority over devices with lower assigned values, or vice versa.

HSS 115 receives a NAS signaling priority value that is set to a "low priority" value (block 410). The network service provider may (e.g., automatically, or manually by a provider operator or administrator), based on the subscriber's subscription to the delay tolerant network service, set the NAS signaling priority value to the "low priority" value. In another embodiment, the NAS signaling priority value may be set to "low priority" based on other criteria, such as a determination that the corresponding device can tolerate a network service delay. In one implementation, if the subscriber has subscribed to the delay-tolerant network service, the NAS signaling priority value may be a set of 8 bits, with bit 0 set to a a value of 1, and the remaining 7 bits cleared to zero (i.e., a value of one in decimal) equaling a "low priority" value (i.e., 000000001). In this implementation, if the NAS signaling priority value is any other bit combination, including 000000000, and 00000010 through 11111111 (i.e., decimals values of 0, and 2-255), then the NAS signaling priority value equals a "normal" NAS priority value.

In another implementation, the delay-tolerant network service may include three different NAS signaling priority levels—"high," "medium," and "low" priority. In this implementation if the subscriber has subscribed to a "high priority," the NAS signaling priority value may be the set of 8 bits, with bits 0 through 7 set to a value of 1 (i.e., 11111111—a value of 255 in decimal). Further, in this implementation, if the subscriber has subscribed to a "medium priority," the NAS signaling priority value may be the set of 8 bits, with bits 0 through 3 cleared to zero, bit 4 set to a value of one, and bits 5 through 7 cleared to zero (i.e., 00001000—a value of 32 in decimal). Additionally, in this implementation, if the subscriber has subscribed to a "low priority," the NAS signaling priority value may be a set of 8 bits, with bit 0 set to a value of 1, and the remaining 7 bits cleared to zero equaling a "low priority" value (i.e., 000000001—a value of one in decimal).

HSS 115 stores the NAS signaling priority value in the subscriber's service profile HSS 115 (block 420). The service profile in HSS 115 may include other fields that relate to the subscriber's network service information. In implementations described herein, a NAS signaling priority value field may also be included in the service profile, in addition to the other fields containing the subscriber's subscription information.

HSS 115 notifies SIM OTA server 220 or OMA DM server 230 that the subscriber has subscribed to a delay-tolerant network service (block 430), and SIM OTA server 220 or OMA DM server 230, responsive to receipt of the notification, updates the device configuration of subscriber's wireless device(s) with the proper NAS signaling priority value (block 440). HSS 115 may send a notification message, via network 240 and 210 to SIM OTA server 220 or OMA DM server 230. Upon receiving the notification message, SIM OTA server 220 or OMA DM server 230 may, via network 210 and 240, engage in a process that updates the configuration of the subscriber's wireless device (i.e., IoT device(s) 105), including setting a low access priority indicator (LAPI) to a "low priority" value at the delay-tolerant device. In one embodiment (e.g., once the device configuration has been updated), the delay-tolerant device may insert the LAPI within NAS signaling messages subsequently sent to MME 130 in wireless network 240.

Figure 5:
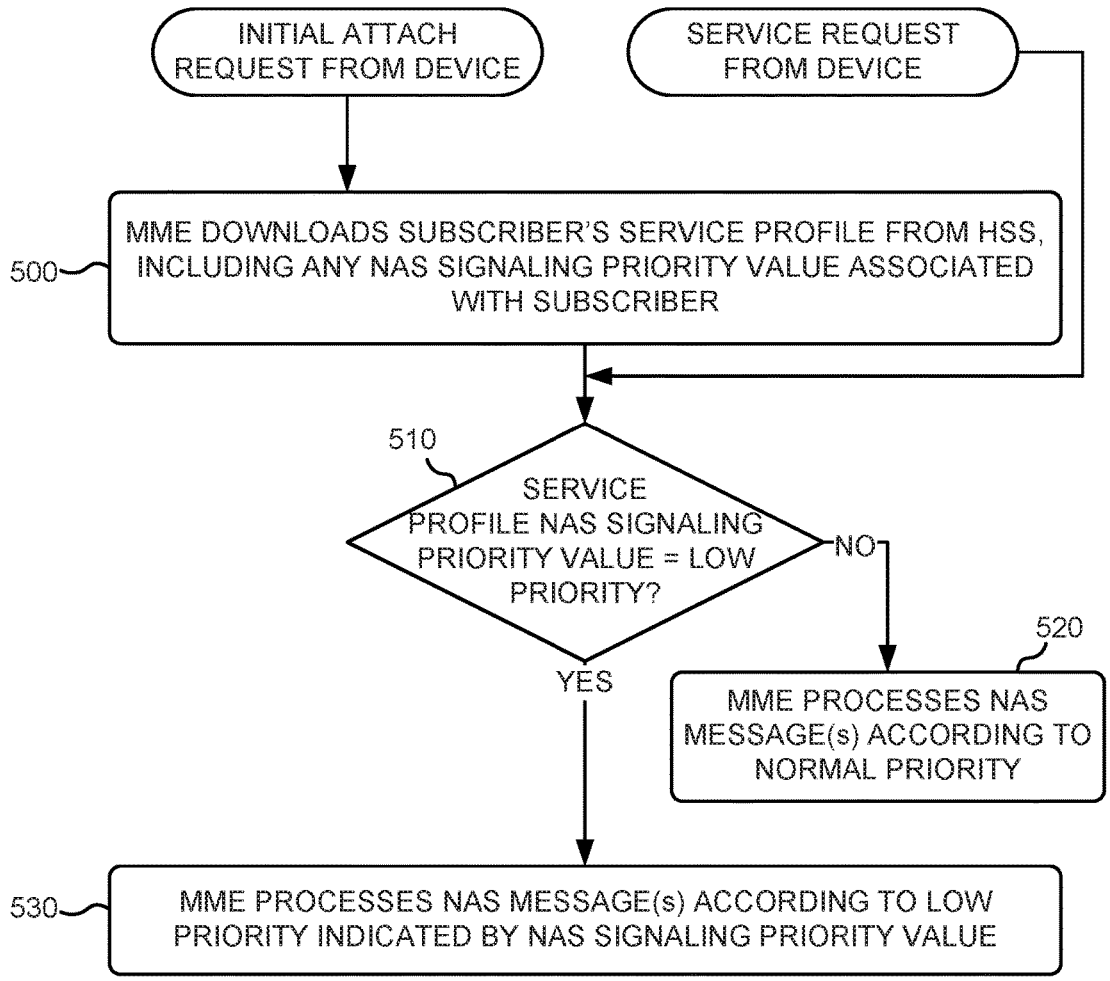
FIG. 5 is a flow diagram that illustrates an exemplary process for processing NAS messaging, received at the mobility management entity of FIG. 1 from a delay-tolerant device and one or more other devices, based on a NAS signaling priority value stored in a subscriber's service profile.

FIG. 5 is a flow diagram that illustrates an exemplary process for processing NAS messaging, received at MME 130 from a delay-tolerant device and one or more other devices, based on a NAS signaling priority value stored in a subscriber's service profile. The exemplary process of FIG. 5 may be implemented by MME 130, in conjunction with HSS 115. The exemplary process of FIG. 5 is described below with reference to the exemplary messaging diagram of FIG. 6. As shown in FIG. 5, the exemplary process may be initiated with the receipt of an initial attach request (or initial Packet Data Network (PDN) connectivity request) from IoT device 105 requesting connectivity with wireless network 240. As further shown in FIG. 5, the exemplary process may also be initiated, at some time point subsequent to IoT device 105 having initially attached to wireless network 240, with the receipt of a subsequent request (e.g., subsequent PDN connectivity request, service request, or other subsequent NAS signaling message) from IoT device requesting network service from wireless network 240. In other embodiments, the exemplary process of FIG. 5 may be implemented by the eNB 250 serving the IoT device 105, in conjunction with HSS 115.

Figure 6:
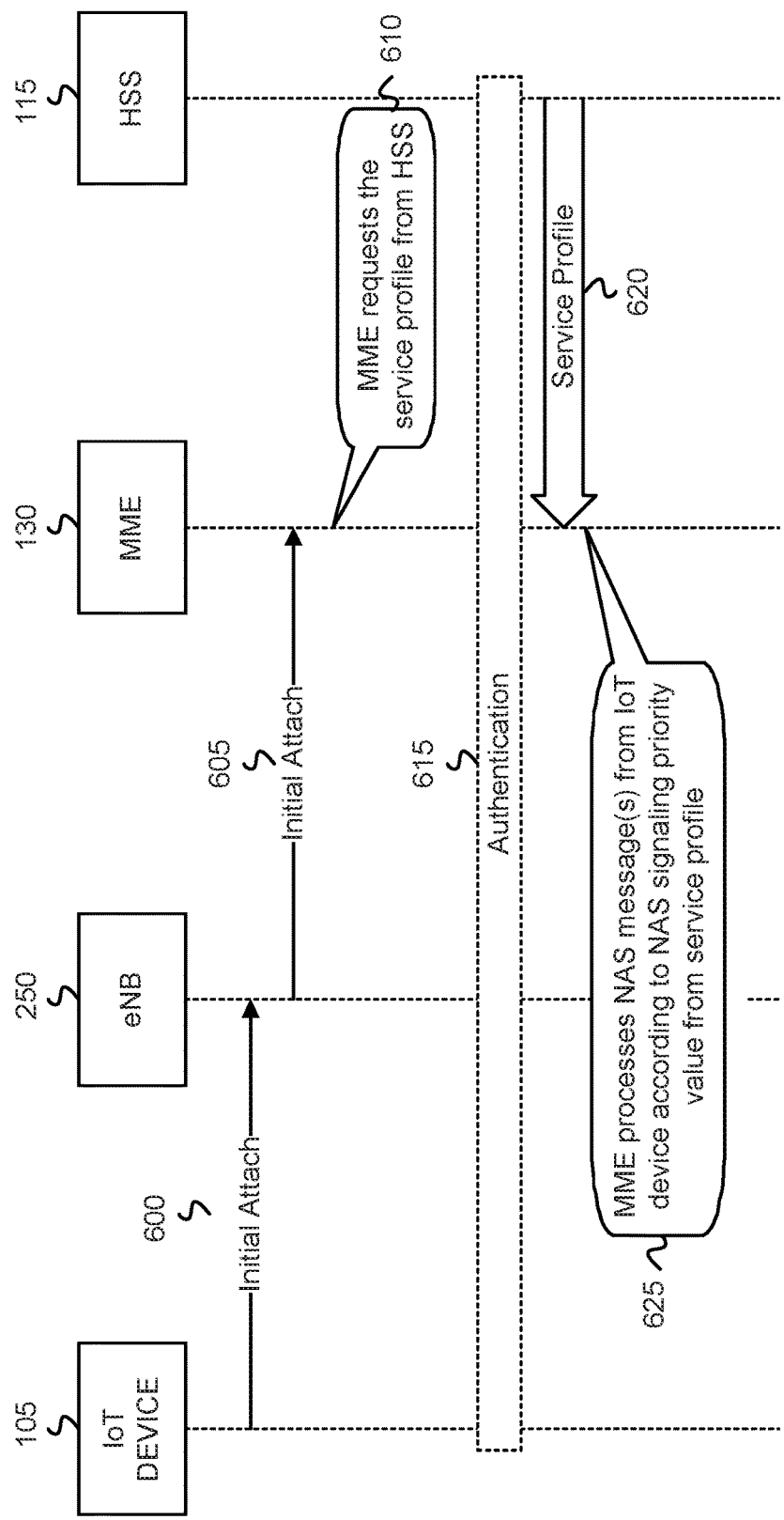
FIG. 6 is an exemplary messaging diagram associated with the exemplary process of FIG. 5.

IoT device 105, when initially connecting to wireless network 240, may send an initial attach message, or an initial PDN connectivity request message, to MME 130 in wireless network 240. The initial attach request, or PDN connectivity request, identifies (e.g., uniquely) the particular IoT device 105 that sent the message and/or identifies (e.g., uniquely) the subscriber that owns, operates, or administers the particular IoT device 105, such that the identifier may be used to retrieve a service profile from HSS 115. The exemplary process may continue to block 500 after receipt of the initial attach message, or the PDN connectivity request message, at MME 130. Alternatively, at some point subsequent to IoT device 105 having initially attached to wireless network 240, IoT device 105 may send a service request message, or subsequent PDN connectivity request, to MME 130 requesting network service from wireless network 240. The service request message may also identify (e.g., uniquely) the particular IoT device 105 that sent the message and/or identify (e.g., uniquely) the subscriber that owns, operates, or administers the particular IoT device 105, such that the identifier may be used to retrieve a service profile from HSS 115. The exemplary process may continue at block 500 after receipt of the service request message at MME 130. FIG. 6 depicts IoT device 105 sending an initial attach message 600 to eNB 250, which forwards a corresponding initial attach request message 605 to MME 130.

MME 130 downloads the subscriber's service profile from HSS 115, including any NAS signaling priority value associated with the subscriber (block 500). The identifier of the particular IoT device 105 that the service provider uses to operate or administer the particular IoT device 105, such as, for example, the International Mobile Subscriber Identity (IMSI) or the Mobile Station International Subscriber Directory Number (MSISDN), may be used to index the HSS 115 to search for a corresponding subscriber service profile stored at HSS 115. The identified subscriber service profile may then be sent by HSS 115 to MME 130. FIG. 6 depicts MME 130 requesting 610 the service profile from HSS 115, and subsequent authentication 615 that occurs to authenticate IoT device 105. Upon successful authentication 615, HSS 115 sends 620 the service profile to MME 130. MME 130 determines if the service profile includes a NAS signaling priority value that has been set to a "low priority" value (block 510). If the service profile contains to NAS signaling priority value, or if the NAS signaling priority value is not set to a "low priority" value (NO—block 510), then MME 130 processes NAS message(s), from IoT device 105, and other IoT devices 105 or other UEs, received in a same time period, according to a normal priority (block 520). A "normal priority" may include processing NAS signaling messages received in a same time period (i.e., within a certain interval of time that may range, for example, from several microseconds to a few seconds)) on a first-come-first-served basis such that none of the wireless devices associated with the NAS signaling messages are given any less, or more, priority than any other wireless devices.

If the service profile contains a NAS priority value and the NAS signaling priority value is set to the "low priority" value (YES—block 510), then MME 130 processes the NAS message, associated with the IoT device 105, relative to other IoT devices 105 or other UEs received in a same time period, according to the low priority indicated by the NAS signaling priority value (block 530). For example, MME 130 may process the NAS messages (e.g., all of the NAS messages) associated with wireless devices (e.g., UEs 150) not having NAS signaling priority values set to "low priority" before processing the NAS message associated with a wireless device (e.g., IoT device 105) having a NAS signaling priority value that is set to "low priority." Therefore, with the NAS signaling of the wireless device having a NAS signaling priority value set to "low priority" causing the NAS signaling to be processed subsequent to NAS signaling associated with other wireless devices (e.g., UEs 150), there may be a delay in executing any mobility management functions, call control management functions, session management functions, and/or identity management functions performed by MME 130 with respect to the "low priority" wireless device. FIG. 6 depicts MME 130 processing 625 NAS message(s) from IoT device 105 according to the NAS signaling priority value from the downloaded service profile. In one embodiment, the order that MME 130 processes NAS messages may be based on a combination of the priority values and the time of arrival. In this embodiment, an older NAS message associated with a low priority may be processed before a newer NAS message not associated with a low priority.

The exemplary process of FIG. 5 may be repeated at MME 130 for each initial attach request message, PDN connectivity request, service request message, or any other NAS message (e.g., Tracking Area Update message) received by MME 130.

Figure 7A:
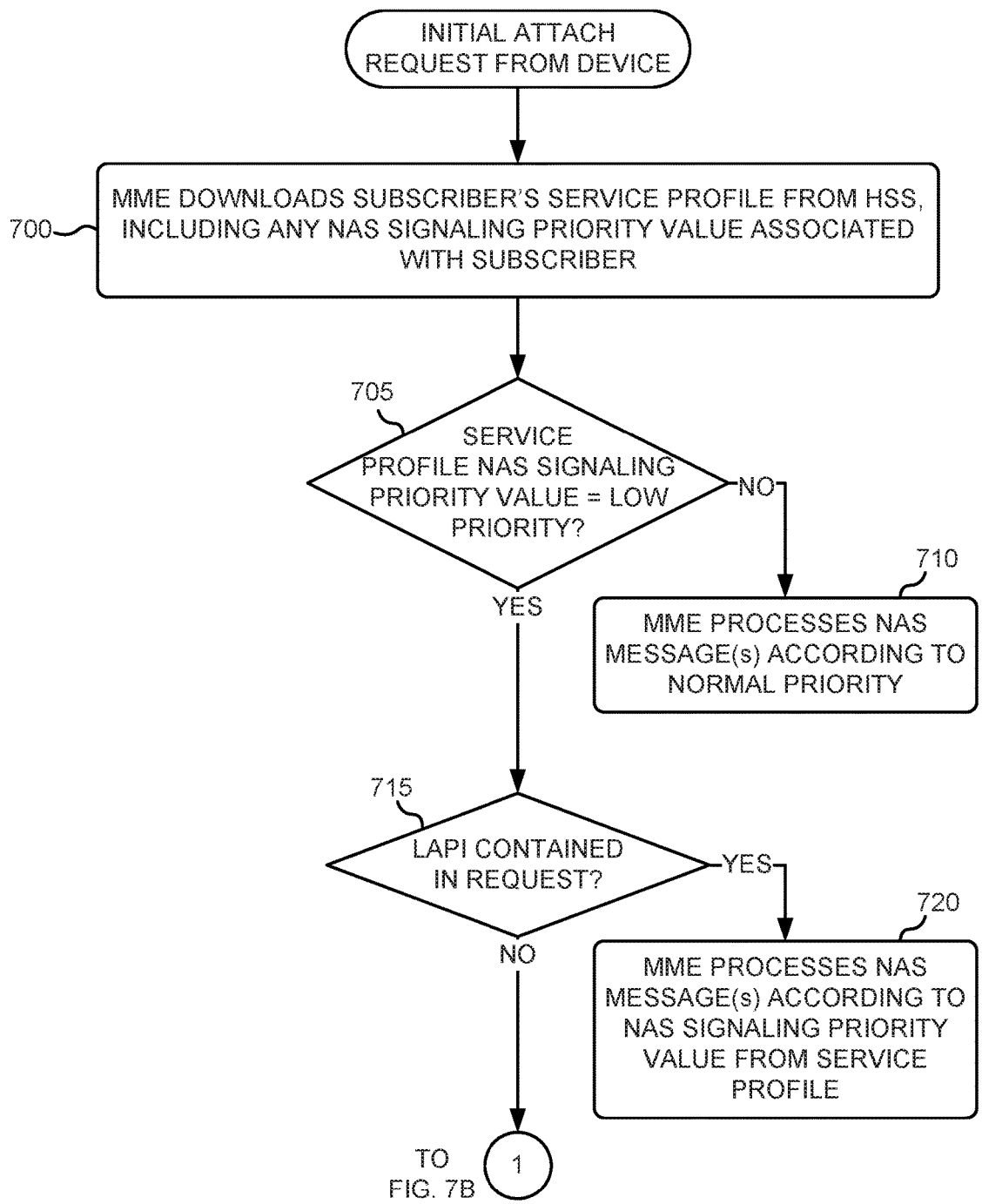
FIGS. 7A and 7B are flow diagrams that illustrate an exemplary process for processing NAS messaging, received at the mobility management entity of FIG. 1 from a delay-tolerant device and one or more other devices, based on a NAS signaling priority value stored in a subscriber's service profile and based on receipt of a low access priority indicator in an initial attach request.
Figure 7B:
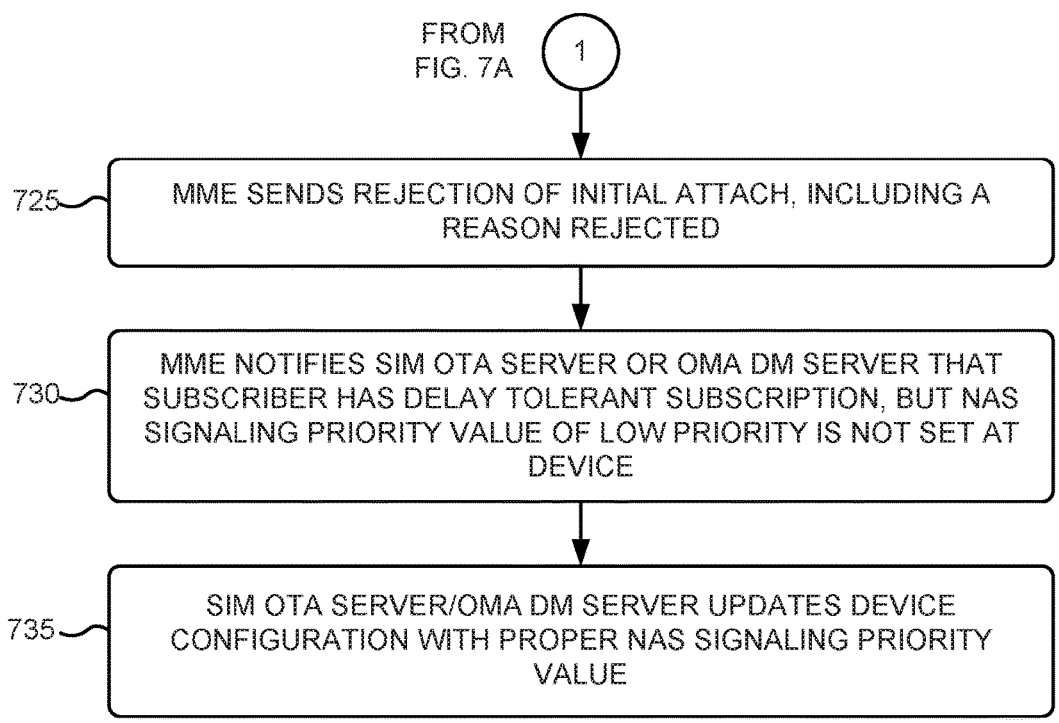
Figure 8:
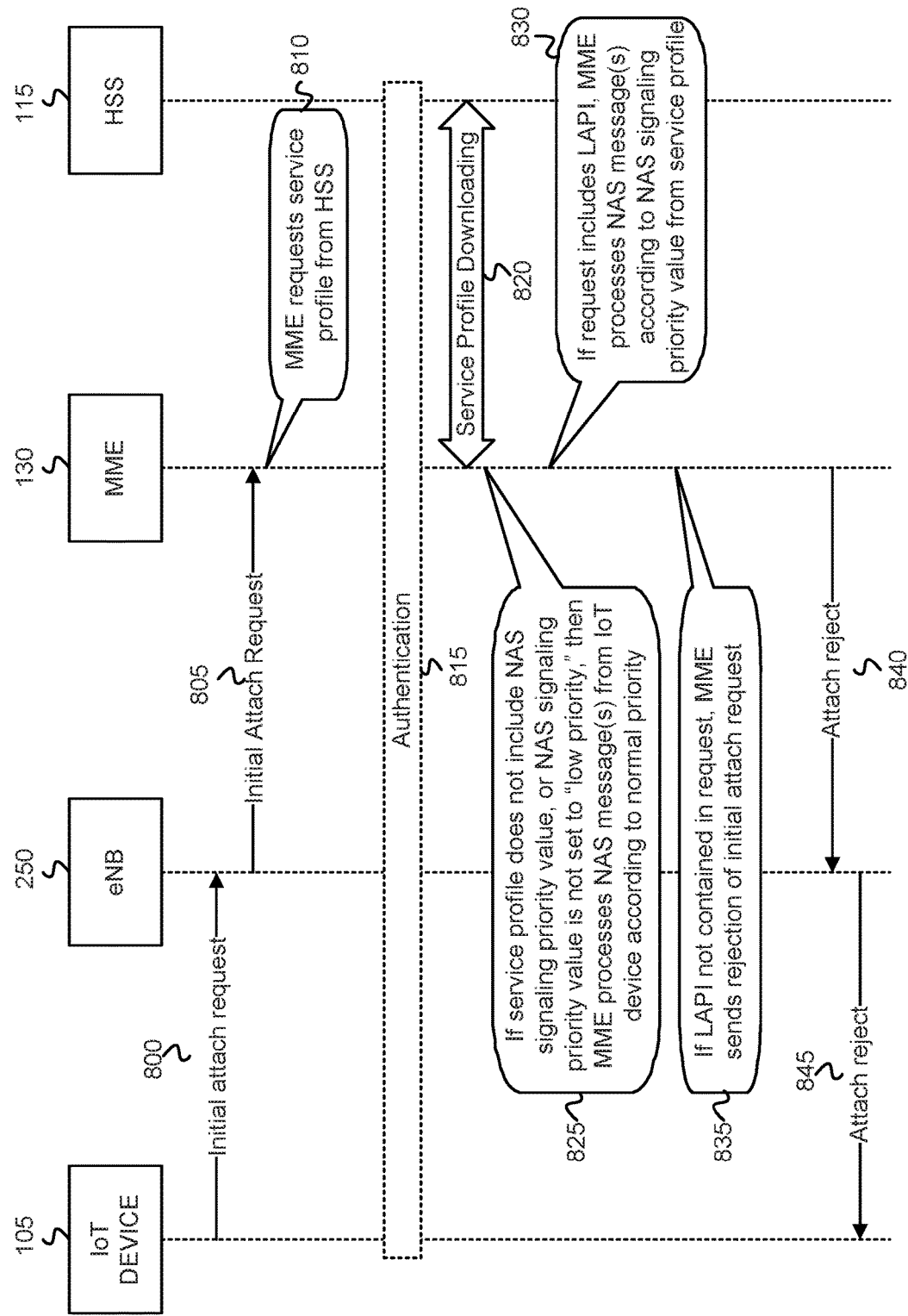
FIG. 8 is an exemplary messaging diagram associated with the exemplary process of FIGS. 7A and 7B.

FIGS. 7A and 7B are flow diagrams that illustrate an exemplary process for processing NAS messaging, received at MME 130 from a delay-tolerant device and one or more other devices, based on receipt of a low access priority indicator in an initial attach or register request and based on a NAS signaling priority value stored in a subscriber's service profile. The exemplary process of FIGS. 7A and 7B may be implemented by MME 130, in conjunction with HSS 115. The exemplary process of FIGS. 7A and 7B is described below with reference to the exemplary messaging diagram of FIG. 8. As shown in FIG. 7A, the exemplary process may be initiated with the receipt of an initial attach request (or Packet Data Network (PDN) connectivity request) from IoT device 105 requesting connectivity with wireless network 240. In other embodiments, the exemplary process of FIG. 5 may be implemented by the eNB 250 serving the IoT device 105, in conjunction with HSS 115. The initial attach message identifies (e.g., uniquely) the particular IoT device 105 sending the message and/or identifies (uniquely) the subscriber that owns, operates, or administers the particular IoT device 105, such that the identifier may be used to retrieve a service profile from HSS 115. FIG. 8 depicts IoT device 105 sending an initial attach message 800 to eNB 250, which forwards a corresponding initial attach request 805 to MME 130.

MME 130 downloads the subscriber's service profile from HSS 115, including any NAS signaling priority value associated with the subscriber (block 700). The identifier of the particular IoT device 105 and/or the identifier of the subscriber that owns, operates or administers the particular IoT device 105, may be used to index the HSS 115 to identify a corresponding subscriber service profile stored at HSS 115. The identified subscriber service profile may then be downloaded by MME 130. FIG. 8 depicts MME 130 requesting 810 the service profile from HSS 115, and subsequent authentication 815 that occurs to authenticate IoT device 105. Upon successful authentication 815, MME 130 is permitted to download 820 the service profile from HSS 115.

MME 130 determines if the service profile includes a NAS signaling priority value that has been set to a "low priority" value (block 705). If the service profile contains no NAS signaling priority value, or if the NAS signaling priority value is not set to a "low priority" value (NO—block 705), then MME 130 processes NAS message(s), from IoT device 105, and other IoT devices 105 or other UEs, received in a same time period, according to a normal priority (block 710). A "normal priority" may include processing NAS signaling messages received in a same, configurable time period (i.e., within a certain interval of time, such as, for example, an interval from about 10 microseconds to about 5 seconds) on a first-come-first-served basis such that none of the wireless devices associated with the NAS signaling messages are given any less, or more, priority than any other wireless devices. In one implementation, the configurable time interval may be an interval of 50-100 milliseconds. The configurable time interval may, however, include any interval of time over which it is to be considered that different NAS messages are received at a same time. FIG. 8 depicts MME 130 processing 825 NAS message(s) from the IoT device 105 according to a normal priority, if the service profile does not include a NAS signaling priority value, or the NAS signaling priority value is not set to "low priority."

If the service profile contains a NAS priority value and the NAS signaling priority value is set to the "low priority" value (YES—block 705), then MME 130 determines if a low access priority indicator (LAPI) is contained in the initial attach request message (block 715). If an LAPI is contained in the initial attach request (YES—block 715), then MME 130 processes the NAS message, relative to NAS messages from other IoT devices and/or other UEs received in a same time period, in accordance with the NAS signaling priority value from the service profile (block 720). For example, MME 130 may process the NAS messages (e.g., all of the NAS messages) associated with wireless devices (e.g., UEs 150) not having NAS signaling priority values set to "low priority" before processing the NAS message (e.g., initial attach request message) associated with the wireless device (e.g., IoT device 105) having a NAS signaling priority value that is set to "low priority." Therefore, with the NAS signaling of the wireless device having a NAS signaling priority value set to "low priority" causing the NAS signaling to be processed subsequent to NAS signaling associated with other wireless devices (e.g., UEs 150), there may be a delay in executing any mobility management functions, call control management functions, session management functions, and/or identity management functions performed by MME 130 with respect to the "low priority" wireless device. FIG. 8 depicts MME 130 processing 830 NAS message(s) from IoT device 105 according to the NAS signaling priority value from the downloaded service profile, if the initial attach request includes an LAPI. In one embodiment, the order that MME 130 processes NAS messages may be based on a combination of the priority values and the time of arrival. In this embodiment, an older NAS message associated with a low priority may be processed before a newer NAS message not associated with a low priority.

If an LAPI is not contained in the initial attach request (NO—block 715), indicating that the IoT device 105 has not previously been configured with NAS low priority configuration information, then MME 130 sends a rejection of the initial attach request, including a reason rejected (block 725). Since the initial attach message did not include a LAPI, but the corresponding service profile does include a NAS priority value set to "low priority," then, in one embodiment, the request should be rejected, and a device configuration update of the IoT device 105 should be requested from SIM OTA server 220 or OMA DM server 230. The "reason rejected" contained within the rejection message from MME 130 may include a message indicating that the "requested service option not authorized in this PLMN" or "NAS priority field is missing." FIG. 8 depicts MME 130 sending 835 an attach reject message 840 if the initial attach request does not include the LAPI, but the service profile includes a NAS signaling priority value set to low priority. As shown, upon receipt of attach reject message 840 from MME 130, eNB 250 forwards a corresponding attach reject message 845 to IoT device 105.

Since MME 130 has determined (in block 715) that IoT device 105 has not previously been configured with NAS low priority configuration information, MME 130 also notifies SIM OTA server 220, or OMA DM server 230, that the subscriber has a delay-tolerant subscription, but a NAS signaling priority value of low priority has not been set at the IoT device 105 (block 730). MME 130 sends a notification message via networks 240 and 210 to SIM OTA server 220, or OMA DM server 230, where the notification message identifies the IoT device 105 (e.g., by network address, such as Internet Protocol (IP) address), and may also identify the subscriber that owns, operates and/or administers the IoT device 105. SIM OTA server 220, or OMA DM server 230, responsive to receipt of the notification from MME 130, updates the IoT device configuration of the IoT device 105 with a proper NAS signaling priority value (block 735). Upon receiving the notification message from MME 130, SIM OTA server 220 or OMA DM server 230 may, via network 210 and 240, engage in a process that updates the configuration of the subscriber's wireless device (i.e., IoT device(s) 105) based on the NAS signaling priority value of block 705. For example, SIM OTA server 220 or OMA DM server 230 may, to update the device configuration of IoT device 105, set a low access priority indicator (LAPI) at the delay-tolerant device to a "low priority" value that corresponds to the NAS signaling priority value from the subscriber's service profile. Once the device configuration has been updated, the delay-tolerant device can insert the LAPI within NAS signaling messages subsequently sent to MME 130 in wireless network 240.

The exemplary process of FIGS. 7A and 7B may be repeated at MME 130 for each initial attach message received by MME 130.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7A, and 7B, and message flows with respect to FIGS. 6 and 8, the order of the blocks and/or message flows may be varied in other implementations. Moreover, non-dependent blocks may be performed in parallel. Exemplary embodiments have been described herein as NAS message processing being performed by MME 130 based on NAS signaling priority value(s), or based on LAPI's contained in NAS messages. However, in other embodiments, a different network node (e.g., an eNB 250 serving a particular wireless device) may perform the NAS message processing using the processes described herein.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving Non-Access Stratum (NAS) signaling associated with a wireless device of a subscriber to a wireless network service, wherein the NAS signaling includes an identifier associated with the wireless device or the subscriber;
searching, using the identifier, a database associated with a wireless network to locate a service profile of the subscriber;
downloading the service profile of the subscriber from the database associated with the wireless network;
retrieving, from the downloaded service profile, a NAS signaling priority value associated with the subscriber or with the wireless device;
identifying whether the NAS signaling priority value indicates a low priority value; and
prioritizing processing of NAS signaling associated with a plurality of wireless devices based on whether the NAS signaling priority value indicates the low priority value, wherein the plurality of wireless devices includes the wireless device.

2. The method of claim 1, wherein prioritizing the processing of the NAS signaling comprises:
processing the NAS signaling associated with the wireless device, relative to NAS signaling associated with the at least one other wireless device, on a first-come-first-served basis if the NAS signaling priority value does not indicate the low priority value, and
processing the NAS signaling associated with the wireless device, subsequent to the NAS signaling associated with the at least one other wireless device, if the NAS signaling priority value indicates the low priority value.

3. The method of claim 1, wherein the wireless device comprises a device that can tolerate a network service delay, and
wherein the NAS signaling is associated with a subscriber to a delay-tolerant wireless network service.

4. The method of claim 1, wherein the NAS signaling comprises signaling related to at least one of mobility management, call control management, session management, or identity management, associated with the wireless device and with the at least one other wireless device, within the wireless network.

5. The method of claim 1, wherein the database comprises a Home Subscriber Server (HSS) of the wireless network.

6. The method of claim 1, wherein the plurality of wireless devices includes at least one other wireless device and wherein the NAS signaling associated with the wireless device, and the NAS signaling associated with the at least one other wireless device, is received at a network device within the wireless network within a same time period.

7. The method of claim 1, further comprising:
determining if a priority indicator is contained in the NAS signaling; and
sending, if the priority indicator is not contained in the NAS signaling, a notification message to an Over-the-Air (OTA) server or a Device Management (DM) server to cause the OTA server or the DM server to update a device configuration of the wireless device based on the retrieved NAS signaling priority value associated with the subscriber or with the wireless device.

8. A network device, comprising:
a communication interface connected to a network; and
a processor configured to:
receive, via the communication interface, signaling associated with a wireless device of a subscriber to a wireless network service, wherein the signaling includes an identifier associated with the wireless device or the subscriber,
search, using the identifier, a database associated with a wireless network to locate a service profile of the subscriber,
download, via the communication interface, the service profile of the subscriber from a Home Subscriber Server (HSS) associated with the wireless network,
retrieve, from the downloaded service profile, a signaling priority value associated with the subscriber or with the wireless device,
identify whether the signaling priority value indicates a low priority value, and
prioritize the processing of signaling associated with a plurality of wireless devices based on whether the signaling priority value indicates the low priority value, wherein the plurality of wireless devices includes the wireless device.

9. The network device of claim 8, wherein the plurality of wireless devices includes at least one other wireless device and wherein the signaling associated with the wireless device, and the signaling associated with the at least one other wireless device, are received at the network device within a same time period.

10. The network device of claim 8, wherein the processor is further configured to:
determine if a priority indicator is contained in the signaling associated with the wireless device, and
send, if the priority indicator is not contained in the NAS signaling, a notification message to an Over-the-Air (OTA) server or a Device Management (DM) server to cause the OTA server or the DM server to update a device configuration of the wireless device based on the retrieved NAS signaling priority value associated with the subscriber or with the wireless device.

11. The network device of claim 8, wherein the wireless device can tolerate a network service delay, and
wherein the signaling is associated with a subscriber to a delay-tolerant wireless network service.

12. The network device of claim 8, wherein the signaling associated with the plurality of wireless devices comprises Non-Access Stratum (NAS) signaling.

13. The network device of claim 12, wherein the NAS signaling comprises signaling related to at least one of mobility management, call control management, session management, or identity management, associated with the wireless device within the wireless network.

14. The network device of claim 8, wherein the wireless network comprises a Public Land Mobile Network (PLMN).

15. The network device of claim 8, wherein the plurality of wireless devices includes at least one other wireless device and wherein, when prioritizing the processing of the signaling, the processor is configured to:
process the signaling associated with the wireless device, relative to signaling associated with the at least one other wireless device, on a first-come-first-served basis if the signaling priority value does not indicate the low priority value, and
process the signaling associated with the wireless device, subsequent to the signaling associated with the at least one other wireless device, if the signaling priority value indicates the low priority value.

16. A non-transitory storage medium storing instructions executable by a network device, wherein the instructions comprise instructions to cause the network device to:
receive Non-Access Stratum (NAS) signaling associated with a wireless device of a subscriber to a wireless network service, wherein the NAS signaling includes an identifier associated with the wireless device or the subscriber, search, using the identifier, a database associated with a wireless network to locate a service profile of the subscriber, download the service profile of the subscriber from the database associated with the wireless network, retrieve, from the downloaded service profile, a NAS signaling priority value associated with the subscriber or with the wireless device, identify whether the NAS signaling priority value indicates a low priority value, and prioritize the processing of NAS signaling associated with a plurality of wireless devices based on whether the NAS signaling priority value indicates the low priority value, wherein the plurality of wireless devices includes the wireless device.

17. The non-transitory storage medium of claim 16, wherein the wireless device can tolerate a network service delay, and wherein the NAS signaling is associated with a subscriber to a delay-tolerant wireless network service.

18. The non-transitory storage medium of claim 16, wherein the NAS signaling comprises signaling related to at least one of mobility management, call control management, session management, or identity management, associated with the wireless device within the wireless network.

19. The non-transitory storage medium of claim 16, wherein the instructions further comprise instructions to cause the network device to:

determine if a priority indicator is contained in the NAS signaling; and send, if the priority indicator is not contained in the NAS signaling, a notification message to an Over-the-Air (OTA) server or a Device Management (DM) server to cause the OTA server or the DM server to update a device configuration of the wireless device based on the retrieved NAS signaling priority value associated with the subscriber or with the wireless device.

20. The non-transitory storage medium of claim 16, wherein the plurality of wireless devices includes at least one other wireless device and wherein the instructions to cause the network device to prioritize the processing of the NAS signaling further comprise instructions to cause the network device to:

process the NAS signaling associated with the wireless device, relative to NAS signaling associated with the at least one other wireless device of the plurality of wireless devices, on a first-come-first-served basis if the NAS signaling priority value does not indicate the low priority value, and process the NAS signaling associated with the wireless device, subsequent to the NAS signaling associated with the at least one other wireless device of the plurality of wireless devices, if the NAS signaling priority value indicates the low priority value.

\* \* \* \* \*